United States Patent [19]

Kasselmann

[11] 4,191,394
[45] Mar. 4, 1980

[54] TRAILER HITCH

[75] Inventor: John T. Kasselmann, South Bend, Ind.

[73] Assignee: The Bendix Corporation, Southfield, Mich.

[21] Appl. No.: 922,007

[22] Filed: Jul. 3, 1978

[51] Int. Cl.² .................. B62D 13/04; B60T 7/20
[52] U.S. Cl. ..................... 280/432; 188/112 A; 280/444
[58] Field of Search ............ 280/432, 444, 446 R; 188/112 A

[56]  References Cited
U.S. PATENT DOCUMENTS

| 1,894,194 | 1/1933 | Overmon | 280/444 X |
| 3,012,638 | 12/1961 | Morlik | 280/444 X |
| 3,404,757 | 10/1968 | Beach et al. | 188/112 |

Primary Examiner—John A. Pekar
Attorney, Agent, or Firm—Leo H. McCormick, Jr.; Ken C. Decker

[57] ABSTRACT

A hitch for connecting a tow vehicle to a trailer having a toggle plate through which a steering input is transmitted into a steering system on the trailer and a braking input is transmitted into a braking system on the trailer.

3 Claims, 5 Drawing Figures

TRAILER HITCH

BACKGROUND OF THE INVENTION

The size of passenger cars manufactured in the United States have decreased in the past few years. Most of the size decrease has been through a reduction in the size of the luggage trunk. An even further size reduction in passenger cars is anticipated within the next decade which could essentially eliminate the trunk as a place for the transportation of luggage. Since a majority of vehicle owners have become accustomed to traveling distances which require overnight stops, it has been suggested that small cargo trailers could offer a solution to the transportation of luggage. However, before such cargo trailers are generally accepted by most people, it is imperative that stability be maintained between the towing vehicle and the trailer, especially when traveling above 50 miles per hour.

One form of instability exhibited by tow vehicle-trailer combinations currently available is trailer sway which causes the trailer to oscillate in a manner similar to the movement of a pendulum. This instability often causes severe yawing in the trailer which can lead to loss of steering control of the tow vehicle. With an anticipated weight reduction of future vehicles resulting from a decrease in size, the loss of steering control from such instability could be accelerated.

To alleviate such sway instability, some trailers have been equipped with dampening devices attached to the hitches such as: the shock absorbers located on opposite sides of the hitch as disclosed in U.S. Pat. No. 3,722,920; and the friction disc arrangement disclosed in U.S. Pat. No. 3,785,680. These anti-sway devices operate sufficiently as long as the tow vehicle-trailer is moving in a straight line. However, when it is desired to turn the tow vehicle-trailer combination, the tow vehicle must overcome the resistance of the anti-sway devices.

In an effort to overcome the turning resistance of anti-sway devices, a power cylinder disclosed in U.S. Pat. No. 3,834,480 is operationally responsive to the fluid in a power steering system for allowing the trailer to track the tow vehicle during turning operations.

As the size of the trailer was increased to accommodate more cargo, it became evident that the brake system in the tow vehicle would be insufficient to stop this tow vehicle-trailer within the safety standards set by the Department of Transportation in the United States. Thus, it became evident that an independent brake system would be needed for the trailer. One such trailer brake system disclosed in U.S. Pat. No. 3,880,263 uses the input force developed between a ball-tongue coupling of the tow vehicle and trailer to operate a pressure producing means which provides the fluid pressure to effect a brake application in the trailer. This type of trailer brake system is completely acceptable for most two wheel trailers. Unfortunately, as the size of vehicles is reduced, the ability to carry a portion of the load of the trailer by the tow vehicle is proportionally reduced.

In an effort to use the same size trailer, it has been suggested in U.S. patent application Ser. No. 921,918 that a nose wheel be added to the tongue of the trailer. The nose wheel is connected to and steerable by the tow vehicle, however, all the braking of the tow vehicle trailer combination is dependent on the brake system in the tow vehicle.

SUMMARY OF THE INVENTION

I have developed a tow vehicle-trailer combination having a hitch with a connecting member through which a braking signal is transmitted into a trailer brake system and a steering signal is transmitted into a trailer steering system.

The connecting member has a bracket which is fixed to the tow vehicle, and first and second bars which pivotally connect the bracket to a plate member located in the trailer. The plate member is connected by a clevis or yoke to the input push rod of a surge brake in the trailer and by first and second connecting rods to the spindle arms of steerable wheels in the steering system of the trailer.

When the tow vehicle-trailer combination is traveling on a roadway and the operator desires to make a stop, the brakes of the tow vehicle are applied causing the tow vehicle to decelerate and develop a force which opposes the acceleration of the trailer. This force which is transmitted through the bracket and first and second bars moves the clevis longitudinally to provide the input for operating the surge brake actuator. At the same time should the operator desire to make a steering maneuver, the steering input from the tow vehicle is transmitted into the steering system of the trailer through the rotation of the plate member with respect to the clevis to move the spindle arms of the steerable wheels on the trailer in a manner substantially identical to the steerable wheels on the tow vehicle.

It is an object of this invention to provide a tow vehicle-trailer combination with a hitch through which an operational steering input and an operational braking input is transmitted into a trailer steering and brake system, respectively.

It is a further object of this invention to provide a hitch for a tow vehicle-trailer combination with a connecting member that moves longitudinally to activate a surge brake in the trailer and rotates with respect to the surge brake to activate a steering system in the trailer.

These and other objects should be apparent from reading this specification and viewing the drawings.

DETAILED DESCRIPTION OF THE INVENTION

Figure 1:
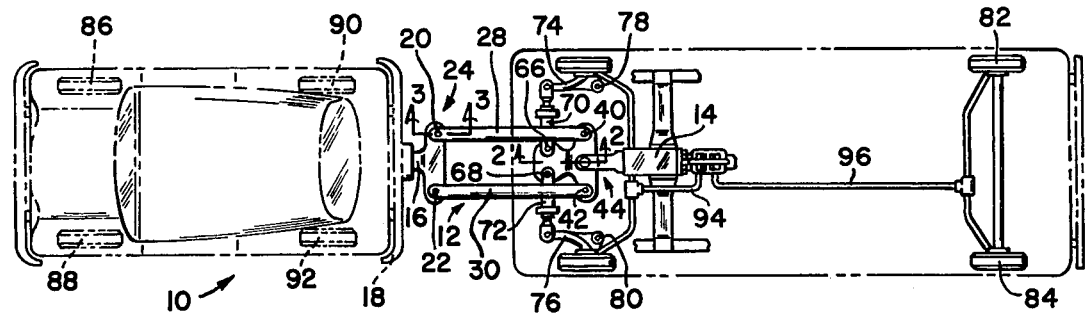
FIG. 1 is a schematic illustration of a tow vehicle-trailer combination having a hitch made according to the principles of this invention.

The tow vehicle-trailer combination 10 shown in FIG. 1 has a hitch 12 through which an operational brake signal is transmitted into a surge brake 14, of the type disclosed in U.S. Pat. No. 3,880,263 and an operational steering signal is transmitted into a steering system in the trailer.

In more particular detail, the hitch 12 has a bracket 16 fixed to the bumper 18 of the tow vehicle. The bracket 16 has connecting pins 20 and 22 attached thereto at a fixed distance apart for securing bars 28 and 30 which connect the bracket 16 to connecting pins 40 and 42 on the connector plate 44 on the trailer.

Each of the bars 28 and 30 have ball joints located on the ends thereof. The ball joints are attached to a connecting pin on either bracket 16 or plate 44.

Figure 3:
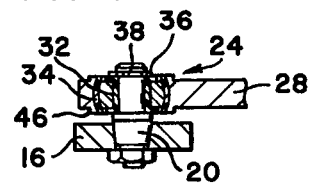
FIG. 3 is a sectional view taken along line 3—3 of FIG. 1.

All the ball joints in the hitch 12 are identical and therefore only ball joint 24 shown in FIG. 3 on the end of bar 28 is described in detail.

The ball joint 24 has a spherical member 34 with an axial bore 32 therethrough which is positioned on pin 20. A cage surface 46 on the end of the bar 28 surrounds a portion of the spherical member 34 to allow the bar to rotate with respect to the connecting pins and thereby compensate for differences in the height of bracket 16 with respect to the connector plate 44. The spherical member 34 is retained on the pin 20 by a snap ring 36 which is located in groove 38 on the pin 20.

Figure 2:
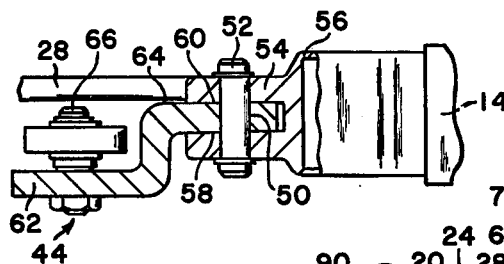
FIG. 2 is a sectional view taken along line 2—2 of FIG. 1.

The connector plate 44, as best shown in FIG. 2, has a hole 50 located in the mid point between pins 40 and 42. A pin 52 passes through hole 50 to attach the connector plate 44 to a clevis 54 on the end of push rod 56 going to the surge brake actuator 14. Surfaces 58 and 60 on the clevis 54 holds the connector plate 44 in a plane that is substantially parallel to a horizontal plane through the trailer. The connector plate 44 has a surface 62 that is offset a fixed distance from surface 64 to allow pins 66 and 68 to move in a plane without touching bars 28 an 30. Connector pins 66 and 68 which are secured to projection surface 62 connect the connector plate 44 to tie rods 70 and 72 going to spindle arms 74 and 76, respectively, on the steerable wheels 78 and 80 on the trailer. The tie rods 70 and 72 are both adjustable for aligning the wheels 78 and 80 with the nonsteerable wheels 82 and 84 on the trailer so that the wheels normally move in a plane parallel to the longitudinal axis of the trailer.

MODE OF OPERATION OF THE INVENTION

Figure 4:
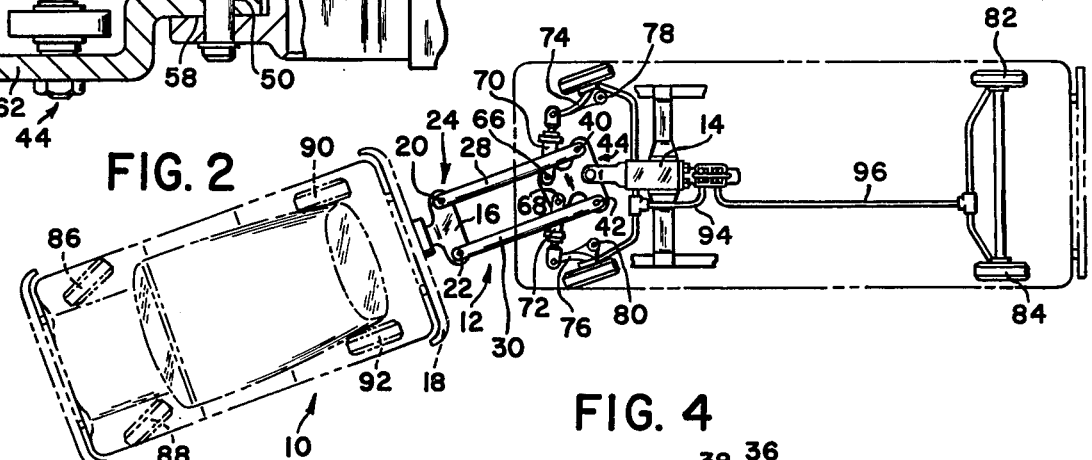
FIG. 4 is a schematic illustration of the tow vehicle-trailer combination showing a steering maneuver.

On a tow vehicle-trailer combination equipped with hitch 12, when the operator desires to make a steering maneuver, the steerable wheels 86 and 88 in the tow vehicle are turned in a manner illustrated in FIG. 4. Since bracket 16 is rigidly secured to bumper 18 on the trailer, bars 28 and 30 rotate the connector plate 44 with respect to pin 52 on the clevis attachment 54 and supply joints 78 and 80 with steering input from the tow vehicle turn the wheels on the trailer. Thus, the steerable wheels on the trailer follow a path that is substantially parallel to wheels 90 and 92 on the tow vehicle and thereby allow the trailer to be steered into any desirable location with ease.

When the operator desires to brake the tow vehicle-trailer combination 10, a brake signal is developed in the tow vehicle which causes a resistive force to be generated between the tow vehicle and the trailer. This resistive force which is carried through the bars 28 and 30 to the connector plate 44 moves the push rod 56 of the surge brake actuator 14 to develop a fluid pressure which is transmitted through conduits 94 and 96 to the wheels on the trailer to effect a brake application.

Figure 5:
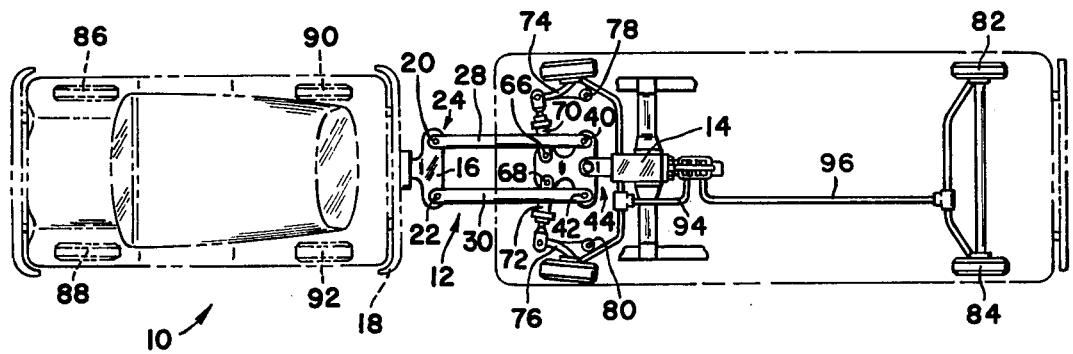
FIG. 5 is a schematic illustration of the tow vehicle-trailer combination showing a braking operation.

It should be noted that during a brake application the connector plate 44 moves longitudinally with respect to the surge brake actuator 14 which is fixed to the housing of the trailer. As the connector plate 44 moves, tie rods 70 and 72 act on spindles 74 and 76 causing the steerable wheels on the trailer to pivot about joints 78 and 80 to be in a manner illustrated in FIG. 5. By selecting the position of pins 66 and 68 on the connector plate 44 and the length of the arms on spindles 74 and 78, the amount of tow-in of the steerable wheels can be minimized to prevent unwanted wear on the tires.

I claim:

1. In a tow vehicle-trailer combination having a steering system on the trailer that responds to a steering input signal created in the tow vehicle, a brake system on the trailer that responds to a braking input signal developed in a surge brake actuator, and a hitch for joining the tow vehicle to the trailer, the improvement in which the hitch includes, a connecting member pivotally attached to said tow vehicle, to said surge brake, and to said steering system, said connecting member comprising:

a bracket fixed to said tow vehicle having a first and second spaced apart pivotal point of attachment;

a clevis attached to an input member of said surge brake actuator;

a plate member having a hole therethrough, said hole being aligned with said clevis;

a pin extending through said hole for connecting said plate with said clevis, said clevis supporting said plate member in said trailer, said plate having third and fourth spaced apart pivotal points of attachment located on opposite sides of said hole;

a first bar attached to said bracket and said plate for connecting said first pivotal point of attachment with said third pivotal point of attachment; and a second bar attached to said bracket and said plate for connecting said second pivotal point of attachment with said fourth pivotal point of attachment, said first and second bars transmitting both the braking input signal and the steering input signal from the tow vehicle to the plate member, said plate member pivoting with respect to said surge brake actuator for transmitting said steering input signal from the tow vehicle to the trailer and moving longitudinally with respect to the tow vehicle for transmitting said braking input into said surge brake actuator to effect a brake application, said first, second, third and fourth spaced apart pivotal points of attachment stabilizing the transmission of said braking input signal to said surge brake actuator to reduce the possibility of introducing a steering input into said steering system during a brake application.

2. In the tow vehicle-trailer combination, as recited in claim 1 wherein said plate further includes:

fifth and sixth spaced apart pivotal points of attachment;

a first adjustable connecting rod attached to said fifth pivotal point of attachment and to a first spindle arm of the steering system; and a second adjustable connecting rod attached to said sixth pivotal point of attachment and a second spindle arm of the steering system, said first and second adjustable connecting rods being adjusted to align the steerable wheels in the steering system with the non-steerable wheels in the trailer.

3. In the tow vehicle-trailer combination as recited in claim 2 wherein said fifth and sixth spaced apart pivotal points of attachment on said plate member are positioned to minimize the effect of the longitudinal movement of the plate member on the first and second spindle arms.

* * * * *